US007415119B2

(12) United States Patent
Boss et al.

(10) Patent No.: US 7,415,119 B2
(45) Date of Patent: Aug. 19, 2008

(54) METHOD FOR HIERARCHICAL AUDIO CONFLICT CONTROL

(75) Inventors: Gregory J Boss, American Fork, UT (US); Carl P. Gusler, Austin, TX (US); Rick A. Hamilton, II, Charlottesville, VA (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 403 days.

(21) Appl. No.: 10/925,262

(22) Filed: Aug. 24, 2004

(65) Prior Publication Data

US 2006/0045280 A1 Mar. 2, 2006

(51) Int. Cl.

| | |
|---|---|
| ***H03G 3/00*** | (2006.01) |
| ***H03G 7/00*** | (2006.01) |
| ***H04R 29/00*** | (2006.01) |
| ***H04M 11/00*** | (2006.01) |

(52) U.S. Cl. ....................... 381/107; 381/104; 381/106; 381/108; 381/56; 379/102.03

(58) Field of Classification Search ................. 340/540; 379/102.03; 455/41.2; 381/56, 104, 105, 381/106, 107, 108

See application file for complete search history.

(56) References Cited

U.S. PATENT DOCUMENTS

| | | | | |
|---|---|---|---|---|
| 5,329,593 | A * | 7/1994 | Lazzeroni et al. | 381/357 |
| 5,424,587 | A * | 6/1995 | Federowicz | 307/140 |
| 5,528,673 | A * | 6/1996 | Rosenthal | 379/102.03 |
| 6,529,605 | B1 | 3/2003 | Christoph | |
| 6,686,839 | B2 * | 2/2004 | Lai et al. | 340/540 |
| 6,999,591 | B2 * | 2/2006 | Fado et al. | 381/58 |
| 2003/0002688 | A1 | 1/2003 | Kanevsky et al. | |
| 2003/0223612 | A1 * | 12/2003 | Knorr et al. | 381/370 |
| 2004/0185778 | A1 * | 9/2004 | Biundo et al. | 455/41.2 |
| 2005/0030168 | A1 * | 2/2005 | Sakai | 340/426.13 |

* cited by examiner

*Primary Examiner*—Vivian Chin
*Assistant Examiner*—George C Monikang
(74) *Attorney, Agent, or Firm*—Schmeiser, Olsen & Watts; John R. Pivnichny

(57) ABSTRACT

A control system and associated method resolving audio conflicts. The control system comprises a computing device, a memory device comprising a database, and a plurality of audio sources. The memory device is coupled to the computing device. The database comprises input data. The computing device is adapted to control an audio level for each of said audio sources in response to said input data to resolve audio conflicts between the audio sources.

10 Claims, 4 Drawing Sheets

1st Audio Source

2nd Audio Source (causing disruption)

| | Device | Telephone (Office) | Telephone (Office) | Doorbell | Television (T.V.) | Vacuum cleaner |
|---|---|---|---|---|---|---|
| | | C1 | C2 | C3 | C4 | C5 |
| R1 | Telephone (Home) | | Between 8am-5pm send office calls to answering service | Lower telephone ring volume | Raise telephone ring volume and pause or disable power to T.V. | Turn off vacuum cleaner |
| R2 | Telephone (Office) | Between 5pm-8am send office calls to answering service | | Lower telephone ring volume | Raise telephone ring volume and pause or disable power to T.V. unless after 7pm then send office calls to answering service | Turn off vacuum cleaner |
| R3 | Doorbell | Allow telephone ring to go through | Allow telephone ring to go through | | Allow telephone ring to go through unless after 10pm then disable doorbell | Turn off vacuum cleaner |
| R4 | Television (T.V.) | Adjust T.V. audio signal 20% below maximum value | Disable power to T.V. or mute T.V. | Lower T.V. volume | | Turn T.V. volume top 66% of maximum volume for x minutes if vacuum still running then pause or disable power to T.V. |
| R5 | Vacuum cleaner | Barrier between audio sources if in different rooms | Disable vacuum cleaner until phone call ends | Barrier between audio sources if in different rooms | Barrier between audio sources if in different rooms and if vacuum still to loud disable T.V. | |

31
32
Control System monitoring
34
Audio Source Activated
36
Logged to Control System
38
Audio Conflict?
No
Yes
40
Check Profile for Action
42
Type of Action
Direct
Indirect
44
Perform Action
46
Perform Action
48
Satisfactory ?
Yes
No
50
Continue Monitoring

METHOD FOR HIERARCHICAL AUDIO CONFLICT CONTROL

BACKGROUND OF THE INVENTION

1. Technical Field

The present invention relates to a system and associated method for controlling audio conflicts.

2. Related Art

Conflicts that arise in a home or office environment may be difficult to resolve thereby causing the home or office environment to operate inefficiently Therefore there is a need for resolving conflicts in a home or office environment.

SUMMARY OF THE INVENTION

The present invention provides a system comprising:

a computing device, a memory device comprising a database, and a plurality of audio sources, wherein the memory device is coupled to the computing device, wherein the database comprises input data, and wherein the computing device is adapted to control an audio level resulting from each of said audio sources in response to said input data to resolve audio conflicts between said audio sources.

The present invention provides a method comprising:

providing a computing device, a memory device comprising a database, said database comprising input data, and a plurality of audio sources, wherein the memory device is coupled to the computing device; and controlling by the computing device, an audio level resulting from each of said audio sources in response to said input data to resolve audio conflicts between said audio sources.

The present invention provides a computer system comprising a processor and a computer readable memory unit coupled to the processor, said memory unit containing a database comprising input data that when executed by the processor to implement a method comprising:

controlling by the processor, an audio level for a plurality of audio sources in response to said input data to resolve audio conflicts between said audio sources.

The present invention provides a computer usable medium having a computer readable program code embodied therein for implementing a method, wherein the computer readable program code comprises a database comprising input data adapted to implement the method comprising:

controlling by the processor, an audio level for a plurality of audio sources in response to said input data to resolve audio conflicts between said audio sources.

The present invention advantageously provides a system and associated method for resolving conflicts in a home or office environment.

BRIEF DESCRIPTION OF THE DRAWINGS

FIG. 2 illustrates a sample user profile that is implemented by the system of FIG. 1, in accordance with embodiments of the present invention.

DETAILED DESCRIPTION OF THE INVENTION

Figure 1:
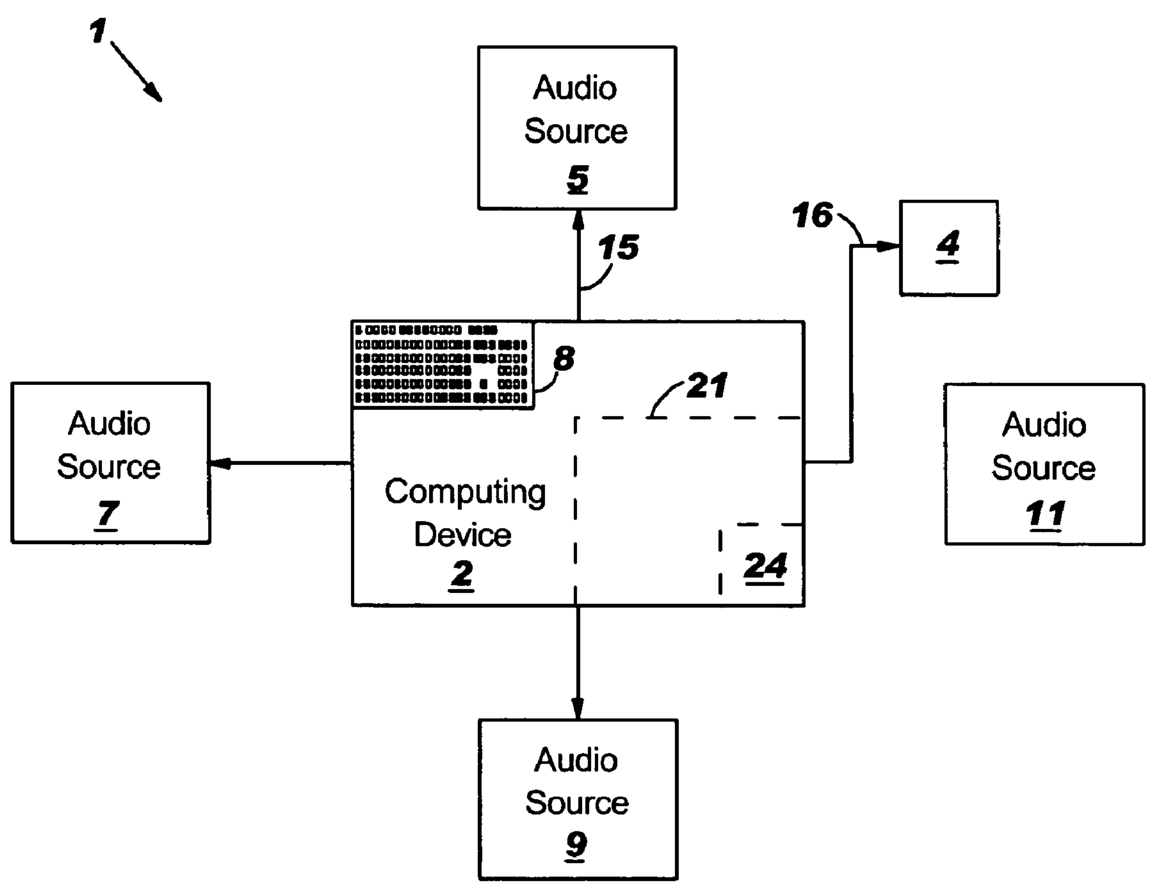
FIG. 1 illustrates a block diagram view of a system for resolving audio conflicts between a plurality of audio sources, in accordance with embodiments of the present invention.

FIG. 1 illustrates a block diagram view of a system 1 for resolving audio conflicts between a plurality of audio sources 5, 7, 9, and 11, in accordance with embodiments of the present invention. In today's technologically heavy environments, at home, work, laboratories, restaurants, bars, reception houses, etc., audible sounds come from a significant number of audio sources (e.g. audio sources 5, 7, 9, and 11). Audio sources in the home environment may include, inter alia, televisions and home theatre systems, home alarm systems, radios, CD and DVD players, vacuum cleaners, human conversation, land-line and cellular telephones, pagers, reminder devices such as PDA's and incoming email audio alerts, heating and cooling equipment, dishwashers, small kitchen appliances such as blenders and mixers, disposals, washers and dryers, lights, refrigerators, humidifiers and purifiers, running water, fireplaces, fans, sounds from outside in the yard and surrounding areas, etc. Audio sources in the work environment may include, inter alia, alarm systems, radios, CD and DVD players, computers, land-line and cellular telephones, pagers, reminder devices such as PDA's and incoming email audio alerts, heating and cooling equipment, fans, sounds from outside and surrounding areas, etc. Many audio sources have audio controls which allow for increasing or decreasing volume (e.g., volume control circuitry). Some audio sources comprise interfaces (e.g., RS-232 interface, remote control sensor circuitry, etc.) to allow for increasing or decreasing volume, temporary pause in operation or disabling of input power using an external control device (e.g., computing device 2). The present invention comprises a system (e.g., system 1 of FIG. 1) and method for a user(s) to determine a user(s) profile comprising a hierarchy for a plurality of audio inputs (i.e., from audio sources) and/or a hierarchy for a plurality of user(s) of the system and control the audio sources according to the hierarchy for the plurality of audio inputs (i.e., from audio sources) and/or the hierarchy for a plurality of user(s) of the system. The system 1 is managed by a computing device 2 and a database 24 comprising input data (i.e., comprising said hierarchies) within a memory device 21. User profiles store the preferences of the users of the system 1 and comprise such information (i.e., from the input data) as, inter alia, user ranking, audio sources available for control, a relative aural ranking of each audio source, action to take when an audio conflict occurs between audio sources.

The system 1 comprises a computing device 2 electrically coupled to a plurality of audio sources 5, 7, 9, and 11 through links 15, 17, 18, and 16 respectively. Each of links 15, 17, 18, and 16 may be hardwired links or wireless links. Each of the audio sources 5, 7, 9 are directly coupled (i.e., a direct signal from the computing device 2 through the links to the audio sources 5, 7, 9) to the computing device 2. The audio source 11 is indirectly coupled (i.e., a signal from the computing device 2 through the link 16 to a sensor/sound canceling circuit or a sensor/sound barrier providing system) to the computing device 2. Each of links 15, 17, and 18 may comprise a control circuit (e.g., analog or digital output circuitry) that may be coupled to existing interfaces (e.g., RS-232 interface, remote control sensor circuitry, etc.) on each of audio sources 5, 7, and 9 to allow for directly increasing or decreasing volume, temporary pause in operation or disabling of input power of each audio sources 5, 7, and 9. Alternatively, each of links 15, 17, and 18 comprise a control circuit (e.g., a relay circuit) between between an input power source (e.g., wall outlet for AC power) and each of the audio sources 5, 7, and 9 to allow for disabling power to each of the audio sources 5, 7, and 9. The link 16 couples the computing device 2 to a circuit/system 4. The circuit/system 4 provides a means to control indirectly an audio conflict between any of audio sources 5, 7, and 9 and the audio source 11 in a case where the audio source 11 is uncontrollable (e.g., audio source 11 is external noise, human conversation, etc.). The circuit/system 4 may sense an audio level of the audio source 11 and provide a sound canceling signal (i.e., an audio signal that is opposite to an audio signal from the audio device 11) to cancel an audio signal from the audio source 11 thereby resolving the audio conflict. Alternatively, the circuit/system 4 may sense an audio level of the audio source 11 and provide a barrier (e.g. close a door using a solenoid) between the audio source 11 and the audio sources 5, 7, and 9 thereby resolving the audio conflict. The computing device 2 comprises an input device 8 and a memory device 21. The memory device 21 comprises a database comprising control software and input data for controlling audio levels (including disabling power) of the audio sources 5, 7, 9, and 11 according to a hierarchal ranking for the audio sources 5, 7, 9, and 11 and plurality of users of the system 1. The input data is entered though the input device 8. The input device 8 may be any input device known to a person of ordinary skill in the art including, inter alia, a keyboard, a keypad, etc. The computing device 2 may be any computing device known to a person of ordinary skill in the art including, inter alia, a personal computer, a laptop computer, a computer system or network, etc.

In the system 1 comprising the input data with said hierarchies in place, the user(s) have the ability to make control audio levels which are most meaningful or valuable to the user(s) in a multi-sound environment. The system 1 may control audio levels of the audio sources when two audio sources (e.g., 5, 7, 9, and 11) conflict audibly or when a desired audio level, or the lack thereof, is maintained. The system 1 may control the conflict by causing a lesser desirable audio level to decrease in volume or by increasing a more desirable audio level, based on a user profile comprising said hierarchy. The means used to alter or control a sound can be done directly by electronic or mechanical means (through existing interfaces to control audio levels and/or disabling input power to an audio source) or indirectly (e.g., sound canceling, providing a barrier between audio sources, etc.) by blocking audio levels. For example, opening or closing a door to a room where a sound is originating is an indirect means of controlling audio levels. Another indirect means would include canceling out a sound's analog wave pattern with another analog pattern directly out of phase to the original, using one or more speakers strategically located. An example of a direct means would be sending an electronic signal from the computing device 2 through an existing interface to a radio or TV to cause the device to lower or raise its volume. A simple example of a user(s) profile (i.e, derived from input data) comprising a hierarchy for a plurality of audio inputs (i.e., from audio sources) and actions to be taken is shown in Table 1.

TABLE 1

User profile

| Audio source | Hierarchal Rank | Low Rank Action | High Rank Action |
|---|---|---|---|
| Telephone | 1 | None | Take action on conflicting sound |
| Doorbell | 1 | None | Take action on conflicting sound |
| Television (T.V.) | 2 | Reduce TV volume | Take action on conflicting sound |
| Vacuum cleaner | 20 | Disable power | None |

In the user profile of Table 1, the telephone and door bell are the highest ranked audio sources and therefore all conflicting audio from any other audio sources should be controlled by the computing device 2 so that the telephone and door bell can always be heard. The television, with a ranking of 2, would only be interrupted by the telephone or door bell with an action of reducing the volume of the audio signal. The vacuum cleaner is very low priority (i.e., ranking of 20) and could be affected by most other audio sources. Note also that beside a simple ranking, a finer-granularity weighting system could be employed, such that multivariate sources could be pieced together to ensure that overall audio noise does not exceed certain thresholds (e.g., an audio signal level safety threshold so that an audio level does not become to high and damage the audio source or become too loud for a person). Note that a weighting system would offer certain advantages, such as assurance that a slightly higher priority device (e.g., the television) does not completely overwhelm a lower priority device (e.g., the radio). A user profile may be developed to manage significantly higher-priority items, such as doorbell and telephone, and accordingly, this would not permit only minor variances in priority to result in complete shutdown of slightly lower-priority actions as described in FIG. 2.

FIG. 2 illustrates a sample user profile 30 that is implemented by the system 1 of FIG. 1, in accordance with embodiments of the present invention. In FIG. 2 the user profile allows for explicit action definition between a $1^{st}$ active audio source (columns C1-C5) in which a user is interacting and a conflicting $2^{nd}$ active audio source (rows R1-R5) causing a disruption. As a first example, if the doorbell in column C3 is activated at a same time as the home telephone in row R1 then the action taken by the system 1 is to lower a ring volume of the home telephone. As a second example, if the office telephone in column C3 rings at a same time as the T.V. in row R4 is activated, then the action taken by the system 1 is to mute the T.V. or disable power to the T.V.

Figure 3:
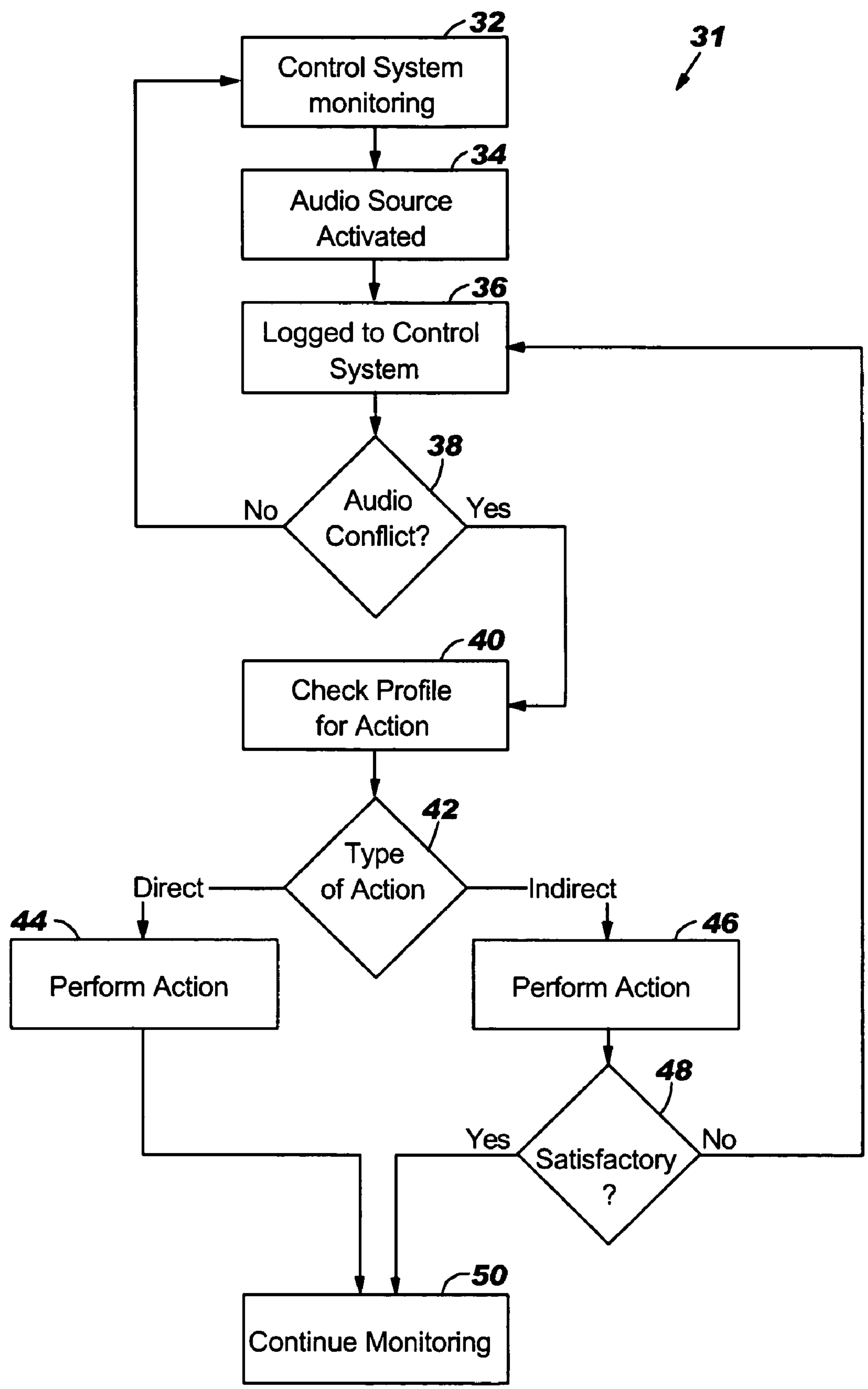
FIG. 3 is a flowchart illustrating process control logic for resolving audio conflicts, in accordance with embodiments of the present invention.

FIG. 3 is a flowchart 31 illustrating process control logic for resolving audio conflicts, in accordance with embodiments of the present invention. The process control logic is implemented by the system 1 of FIG. 1. In step 32, the system 1 comprising a user profile(s) monitors the audio sources within the system 1. In step 34, an audio source is activated and logged to the system 1 in step 36. In step 38, the system 1 determines if there is an audio conflict between audio sources. If there is no audio conflict in step 38, then the system 1 goes back to step 32 and monitors the audio sources. If there is an audio conflict in step 38, then in step 40 the system 1 checks the user profile for a type of action to be taken. If step 42 determines that the action to be taken in is a direct action then a direct action (e.g., action through existing interfaces and/or disabling input power to an audio source) is taken in step 44 and the system 1 continues to monitor in step 50. If step 42 determines that the action to be taken is an indirect action then a indirect action (e.g., sound canceling, providing a barrier between conflicting audio sources) is taken in step 46. In step 48, the system determines if the indirect action taken in step 46 was satisfactory (i.e., provided resolution to audio conflict). If the indirect action taken in step 46 was not satisfactory then the system 1 goes back to step 36. If the indirect action taken in step 46 was satisfactory then the system 1 continues to monitor in step 50.

The following examples provide sample user profile scenarios using the logic of the flow chart 31:

In a first example, an incoming phone call is evaluated against the profile and is found to take the highest priority. If the user is watching a television show, the home entertainment system will be muted, or the volume decreased to a significant degree. Other home devices that are audibly affecting the user are also minimized. Stereos, televisions, and even appliances could temporarily be turned off. Other devices that maintain a critical status such as the refrigerator stay on but could be minimized indirectly by a noise canceling speaker located in the kitchen, or could be managed such that the internal temperature is allowed to rise to a certain acceptable threshold prior to running the condenser and evaporator motors.

In a second example, an incoming phone call is evaluated against the profile and is found to take a very low priority. In this case, the profile might compare the user's current activity of watching a movie with the family as being higher than the incoming phone call. The system 1 "knows" (i.e., by the user profile) that the user will not answer the call, so instead of allowing the phone to ring and disturb the user's movie experience, the system mutes all phones within audible distance to the home theater but allows other phones to ring throughout the house, enabling others who may not be occupied with the movie to answer the call. Alternatively, the profile might indicate complete muting of the call, and instant forwarding to the answering machine. Furthermore, the muting/redirection could be contingent on the caller id value, wherein a teenage child's cell phone may preempt all other inputs, but no other calls will come through. Calls can be selectively re-directed to a multitude of points, while maintaining a stealth silence mode of operation. Preset times can be established for muting the phone (like dinnertime, or middle of the night) so as not to be interrupted or comparison of one activity to another can be evaluated using the profile. After the movie is over, the system could send an audible message to the home theaters speakers to inform the user that he has received "X" number of messages in the past "Y" hours.

Figure 4:
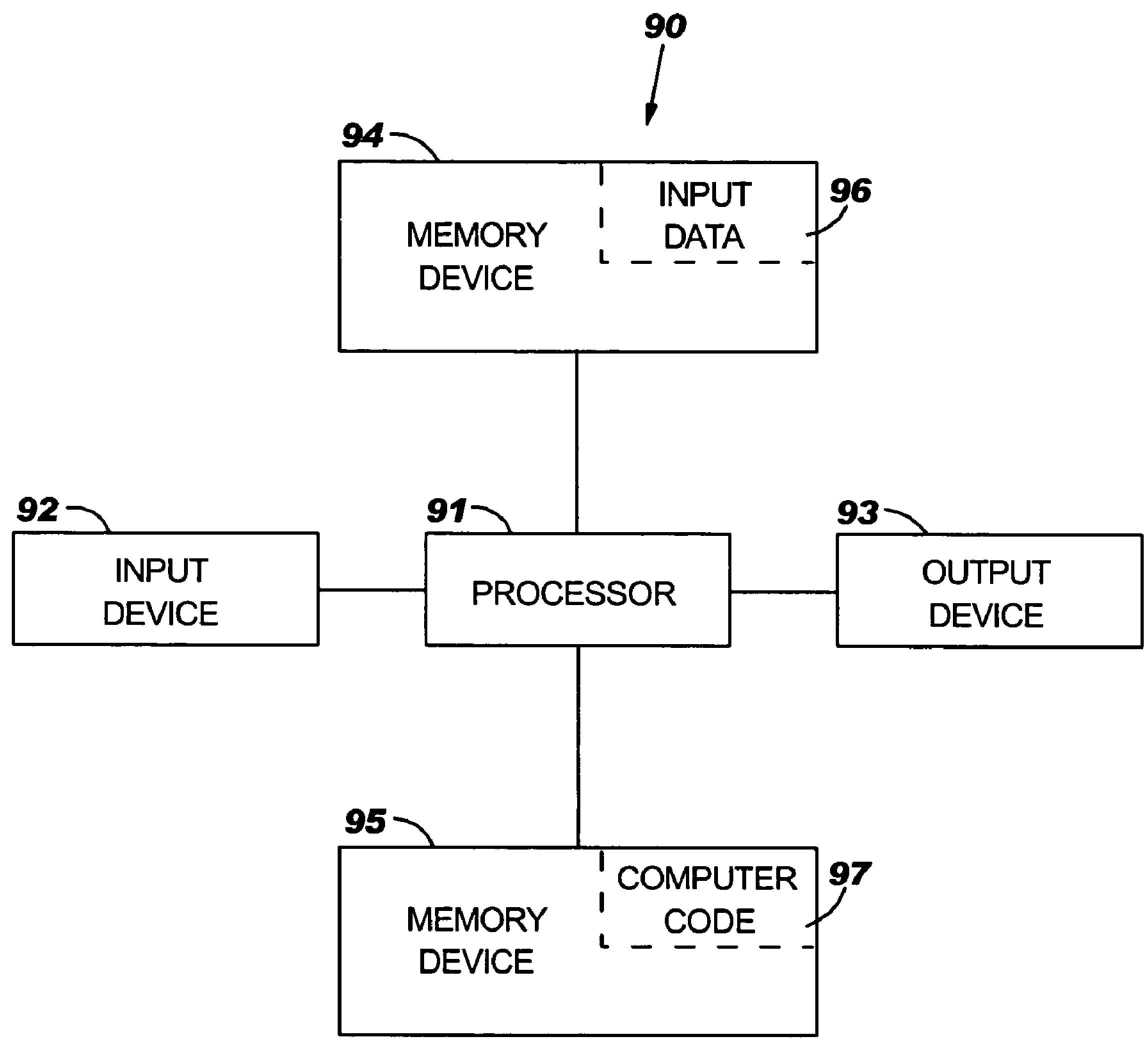
FIG. 4 illustrates a computer system used for controlling audio conflicts of the present invention.

FIG. 4 illustrates a computer system 90 used for controlling audio conflicts of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithm(s) creating the user profile of the present invention and controlling audio conflicts using the user profile. The processor 91 executes the computer code 97. The memory device 94 includes input data 96 (for the user profile). The memory device 94 memory device 95, and the processor 91 may relate to the computing device 2 of FIG. 1. The input data 96 includes input required by the computer code 97. The output device 93 displays output from the computer code 97. Either or both memory devices 94 and 95 (or one or more additional memory devices not shown in FIG. 4) may be used as a computer usable medium (or a computer readable medium or a program storage device) having a-computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices. As another example, the hardware and software environments of FIGS. 1-3, discussed supra, may be utilized. While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for controlling audio conflicts between audio sources comprising:

providing a system comprising a computing device, a memory device, a first circuit, a solenoid, a door, and a plurality of audio sources, wherein said memory device comprises a database internal to said memory device wherein said first circuit is external to said computing device and said plurality of audio sources, wherein the memory device is coupled to the computing device ,wherein the database comprises input data, wherein the input data comprises a user profile, wherein said user profile comprises user specified data, wherein the user specified data comprises a hierarchical ranking of said audio sources and threshold data applied to said audio sources, wherein said threshold data comprises a group of audio signal level safety thresholds for audio levels for audio signals from said audio sources, and wherein said threshold data comprises a combination audio signal level safety threshold for combined audio levels for at least two audio signals from said audio sources;

controlling by the computing device, an audio level for an audio signal for each said audio source in response to said input data to resolve audio conflicts between said audio sources, wherein said controlling comprises changing a first audible audio level for a first audio signal from a first audio source of said audio sources to a second audible audio level in response to said input data in order to resolve said audio conflicts, and wherein said first audible audio level comprises a different audible audio level from said second audible audio level;

sensing, by said first circuit, a second audio signal from a second audio source of said audio sources;

activating, by the first circuit in response to said sensing, said solenoid; and closing, by said solenoid in response to said activating, said door thereby placing said door between said second audio source and a third audio source of said audio sources to control an audio conflict between said second audio signal and a third audio signal from the third audio source.

2. The method of claim 1, further comprising:

controlling, by the computing device, the audio level for each said audio source in response to said hierarchical ranking of said audio sources.

3. The method of claim 1, wherein the input data comprises a hierarchical ranking of users of said system, and wherein the method further comprises controlling by the computing device, the audio level for each said audio source in response to said hierarchical ranking of said users.

4. The method of claim 1, further comprising:

electrically coupling the computing device through existing interfaces to existing audio control circuitry for each said audio source; and controlling by the computing device, the audio level of the audio signal for each said audio source through said interfaces.

5. The method of claim 1, wherein the existing interfaces are selected from the group consisting of a RS-232 interface and a remote control sensor circuit.

6. The method of claim 1, wherein the input data comprises a safety audio level threshold for each said audio source, and wherein the method further comprises controlling the computing device, the audio level for each of the audio signal for each said audio source in response to said audio level threshold for each said audio source.

7. The method of claim 1, further comprising disabling by the computing device, power to at least one of said audio sources to control an audio level of one of said audio sources.

8. The method of claim 1, wherein the system further comprises a second circuit, and wherein the method further comprises:

sensing, by said second circuit, a fourth audio level for a fourth audio signal from a second fourth audio source of said audio sources; and providing, by said second circuit, a noise canceling audio signal in order to control the fourth audio level, wherein the noise canceling audio signal comprises an audio signal that is opposite to the fourth audio signal.

9. The method of claim 1, wherein said hierarchical ranking comprises a tabular format.

10. The method of claim 1, wherein said input data comprises a specified time period for controlling a first audio level of a first audio signal from a first audio source of said audio sources.

* * * * *